United States Patent
Yamamoto

(10) Patent No.: US 7,446,759 B2
(45) Date of Patent: Nov. 4, 2008

(54) ARRAY SUBSTRATE FOR FLAT DISPLAY DEVICE

(75) Inventor: Mitsuhiro Yamamoto, Fukaya (JP)

(73) Assignee: Toshiba Matsushita Display Technology Co., Ltd., Tokyo (JP)

(*) Notice: Subject to any disclaimer, the term of this patent is extended or adjusted under 35 U.S.C. 154(b) by 598 days.

(21) Appl. No.: 10/541,552

(22) PCT Filed: May 28, 2004

(86) PCT No.: PCT/JP2004/007372

§ 371 (c)(1),
(2), (4) Date: Jul. 6, 2005

(87) PCT Pub. No.: WO2004/107030

PCT Pub. Date: Dec. 9, 2004

(65) Prior Publication Data
US 2006/0114202 A1 Jun. 1, 2006

(30) Foreign Application Priority Data
May 30, 2003 (JP) .............................. 2003-155018

(51) Int. Cl.
G06F 3/038 (2006.01)
G09G 3/36 (2006.01)
(52) U.S. Cl. ........................................ 345/204; 345/99
(58) Field of Classification Search .................. 345/87, 345/99, 100, 204
See application file for complete search history.

(56) References Cited

U.S. PATENT DOCUMENTS 5,784,042 A * 7/1998 Ono et al. ...................... 345/94
6,310,673 B1 * 10/2001 Sharp .......................... 349/106
6,628,261 B1 * 9/2003 Sato et al. ...................... 345/99
2001/0028416 A1 * 10/2001 Divelbiss et al. ............... 349/43
2002/0018039 A1    2/2002 Morita
2002/0033932 A1 * 3/2002 Yamamoto et al. ............. 353/31
2002/0180933 A1 * 12/2002 Ito ................................ 353/20
2003/0058375 A1 * 3/2003 Moon et al. .................... 349/42
2003/0107544 A1 * 6/2003 Edwards ....................... 345/96
2004/0145555 A1 * 7/2004 Tai et al. ....................... 345/96
2004/0207593 A1 * 10/2004 Ha et al. ...................... 345/100
2005/0162371 A1    7/2005 Morita

FOREIGN PATENT DOCUMENTS

| EP | 1293957 A2 * | 3/2003 |
|---|---|---|
| JP | 2001-109435 | 4/2001 |
| JP | 2001324963 A * | 11/2001 |
| JP | 2001-337657 | 12/2001 |
| JP | 2001-356366 | 12/2001 |
| JP | 2002-189439 | 7/2002 |
| JP | 3476885 | 9/2003 |
| KR | 2002-0003810 | 1/2002 |

* cited by examiner

Primary Examiner—Amare Mengistu
Assistant Examiner—Elijah M Sheets
(74) Attorney, Agent, or Firm—Oblon, Spivak, McClelland, Maier & Neustadt, P.C.

(57) ABSTRACT

An object of this array substrate for a flat display device is to eliminate display unevenness caused by the inequality of parasitic capacitances of switches of signal line switch circuits. Electrode patterns (P) which connects the gate electrodes of the switches (ASW) to any one of a plurality of switch control signal lines (ASWL1 and ASWL2) are formed so as to each two-dimensionally overlap all of the switch control signal lines ASWL and to have substantially identical shapes, thus equalizing the areas of the electrode patterns (P).

2 Claims, 3 Drawing Sheets

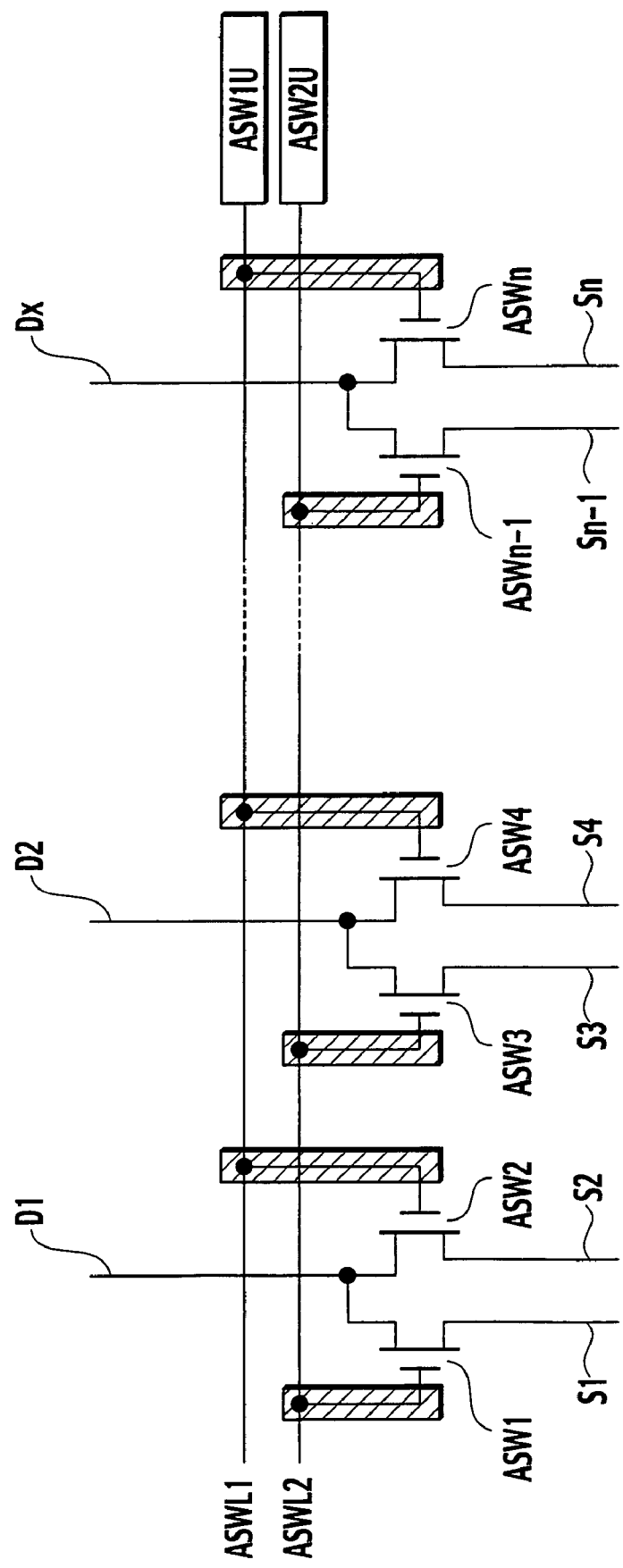

ARRAY SUBSTRATE FOR FLAT DISPLAY DEVICE

TECHNICAL FIELD

The present invention relates to an array substrate for a flat display device. Specifically, the present invention relates to an electrode structure of a signal line drive circuit.

BACKGROUND ART

In word processors, personal computers, portable TVs, and the like, thin and light flat display devices are widely used. In particular, liquid crystal display devices are being actively developed because of the ease of reducing the thickness, weight, and power consumption thereof. Ones having high resolutions and large screen sizes have become available at relatively low prices.

Among liquid crystal display devices, active matrix liquid crystal display devices in which a thin film transistor (TFT) is placed as a switching element in the vicinity of each of the intersections between signal lines and scan lines are considered to become mainstream in the future because of their excellent color appearance and weak afterglow.

In a liquid crystal display device using amorphous silicon TFTs, tape carrier packages (TCPs) are used which are constructed by mounting signal line drive ICs and scan line drive ICs on flexible wiring boards. By electrically connecting these TCPs to external connection terminals of an array substrate, the signal line drive ICs and the scan line drive ICs are electrically connected to pixel electrodes on the array substrate, and pixel transistors are driven.

In this liquid crystal display device using amorphous silicon TFTs, a large number of interconnections are necessary for supplying picture signals from the TCPs to signal lines on an array substrate. Accordingly, in the case where the definition of pixels is improved, it is difficult to ensure a sufficient pitch between the interconnections. In this connection, for example, a technology described in Japanese Unexamined Patent Publication No. 2001-109435 has been known. In this technology, a signal line drive circuit is constructed using a switch circuit formed on an array substrate and signal line drive ICs mounted on TCPs. Each interconnection extended from the signal line drive ICs is connected to two adjacent signal lines one after another within one horizontal scan period using a pair of switches in the switch circuit, thus supplying the two signal lines with picture signals by time division.

In the above-described switch circuit, both of the source electrodes of a pair of switches are connected to a common interconnection extended from a signal line drive IC, the drain electrodes thereof are respectively connected to adjacent different signal lines, and the gate electrodes thereof are respectively connected to different switch control signal lines. Further, a signal line connected to the interconnection is switched according to switch control signals supplied to the gate electrodes.

The gate electrodes of the switches and the switch control signal lines are connected by electrode patterns. The electrode patterns are laid out in accordance with the positions of contact holes connected to the switch control signal lines. Accordingly, when attention is focused on a pair of switches, the left and right switches have different lengths from the switch control signal lines to the respective gate electrodes, and a difference occurs in the areas of the electrode patterns. Thus, the parasitic capacitances become unequal. Consequently, there is a difference between the times required to charge adjacent pixels with data signals. In some cases, display unevenness is caused.

Further, in the above-described layout, electrode patterns having different lengths are alternately arranged in a continuous manner. Accordingly, differences in length are difficult to find, and there is the problem that pattern abnormalities are difficult to find by visual inspection.

Furthermore, in the case where the connections between the electrode patterns and the switch control signal lines are changed, not only a contact hole formation layer but also the electrode patterns need to be changed. Along with this, a plurality of masks needs to be changed. Accordingly, there is the problem that a design change is expensive and that it is difficult to flexibly cope with a change to other drive system having a different connection form.

DISCLOSURE OF THE INVENTION

An array substrate for a flat display device according to a first aspect of the present invention is characterized by including: a display unit in which a pixel is placed at each of intersections between a plurality of signal lines and a plurality of scan lines, which signal and scan lines are routed in the form of a matrix; a plurality of output lines configured to output data signals to the signal lines, respectively; a plurality of switches placed between the output lines and the signal lines to connect each output line to n signal lines (n is an integer equal to or greater than two) one after another within one horizontal period; n switch control signal lines configured to supply control electrodes of the switches with control signals for controlling on and off states thereof; and a plurality of electrode patterns configured to connect the control electrode of each switch to any one of the n switch control signal lines. The array substrate is further characterized in that the electrode patterns each two-dimensionally overlap all of the switch control signal lines and have substantially identical shapes.

In this aspect, the shapes of the electrode patterns connecting the control electrodes of the switches and the switch control signal lines are shapes which two-dimensionally overlap all of the switch control signal lines, and are substantially identical shapes. This equalizes the parasitic capacitances of all switches. Accordingly, it is possible to eliminate display unevenness caused by the inequality of parasitic capacitances and to obtain favorable display characteristics. Further, differences in the lengths of the electrode patterns are easy to find, and pattern abnormalities can be easily found by visual inspection. Thus, process yield can be improved by the early detection of pattern abnormalities.

A second aspect of the present invention is the above-described array substrate for a flat display device which is characterized in that the electrode patterns and the switch control signal lines are stacked with an insulating layer interposed therebetween, and are electrically connected to each other by contact holes formed in the insulating layer.

In this aspect, the electrode patterns and the switch control signal lines are electrically connected by the contact holes. This makes it possible to change the connecting positions between the electrode patterns and the switch control signal lines only by changing a contact hole formation layer. Thus, the cost of a design change can be reduced. Further, it is possible to flexibly cope with a change to other drive system having a different connection form.

BRIEF DESCRIPTION OF THE DRAWINGS

FIG. 3 is a circuit diagram showing the configuration of a signal line switch circuit of a comparative example.

BEST MODES FOR CARRYING OUT THE INVENTION

Hereinafter, an embodiment of the present invention will be described with reference to the drawings.

Figure 1:
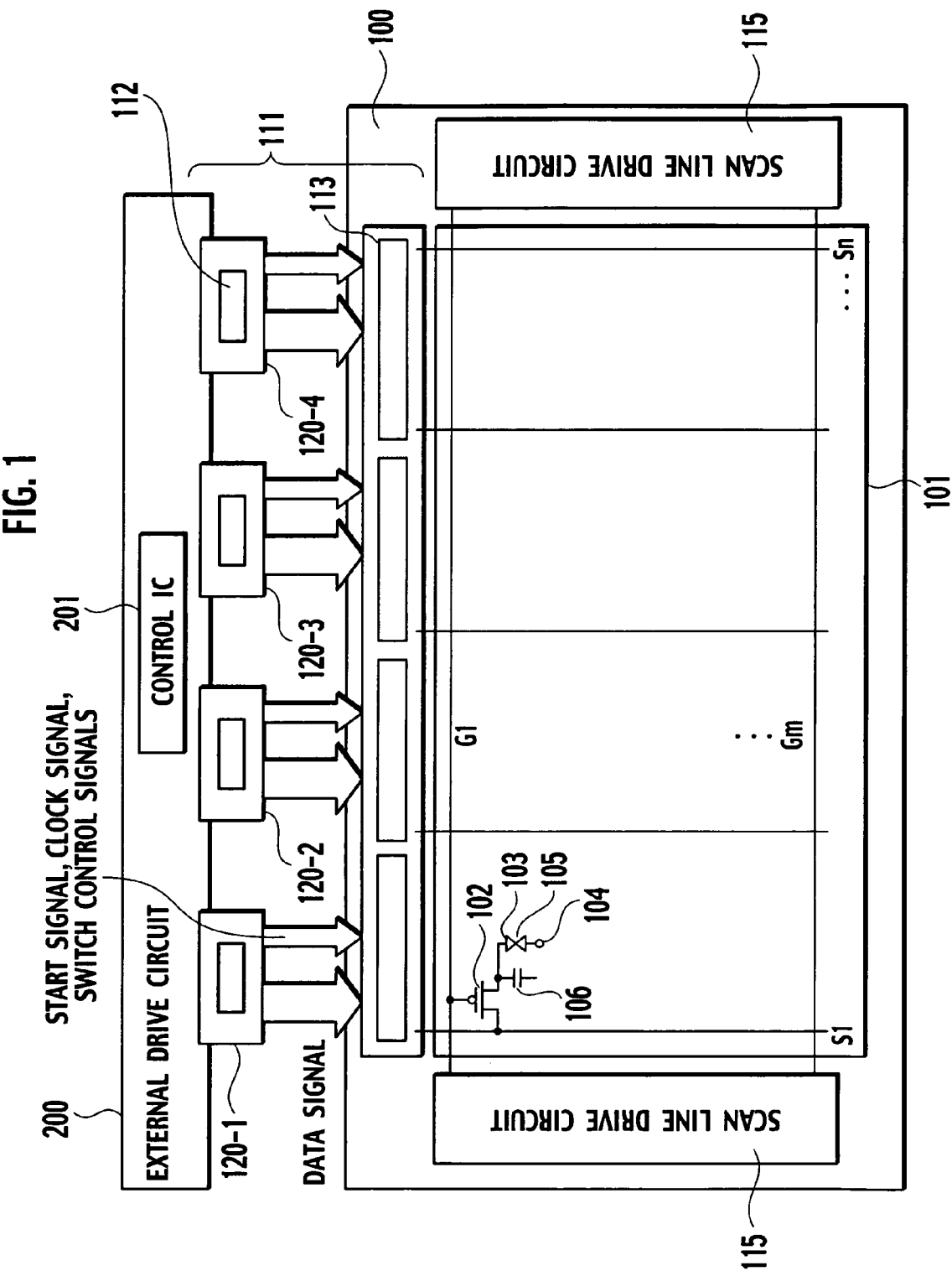
FIG. 1 is a circuit diagram showing the configuration of a flat display device of one embodiment.

As shown in the circuit diagram of FIG. 1, in a flat display device of this embodiment, scan lines G1 to Gm (hereinafter referred to as "scan lines G" as appropriate) and signal lines S1 to Sn (hereinafter referred to as "signal lines S" as appropriate) are routed in the form of a matrix in a display unit 101 on an array substrate 100. A pixel is placed at each of the intersections between the scan lines G and the signal lines S. Each pixel includes a pixel transistor 102, a pixel electrode 103, and an auxiliary capacitor 106. A common electrode 104 placed to face the pixel electrodes 103 is formed on a counter substrate (not shown). A liquid crystal layer 105 is held between the pixel electrodes 103 and the common electrode 104. The auxiliary capacitor 106 is connected in parallel to the pixel electrode 103. A predetermined auxiliary capacitor voltage is supplied to the auxiliary capacitor 106 through an auxiliary capacitor line (not shown).

In an upper edge portion of the display unit 101, signal line drive circuit units 111 are placed. To left and right edge portions of the display unit 101, scan line drive circuits 115 are connected. The display unit 101 is divided into four blocks. The signal lines S are segmented into a predetermined number of signal line groups in each block. Data signals are respectively supplied to the signal lines from the signal line drive circuit units 111 which have identical configurations and which are placed to correspond to the respective blocks.

The signal line drive circuit units 111 include four signal line drive ICs 112 and four signal line switch circuits 113. The signal line drive ICs 112 output data signals to output lines described later, and output various kinds of signals. The signal line switch circuits 113 output data signals supplied from the signal line drive IC 112, to all of the signal lines of each signal line group, one signal line group after another within one horizontal scan period. The signal line drive ICs 112 are mounted on TCPs 120-1 to 120-4. The signal line switch circuits 113 are formed on the array substrate 100. One side edges of the TCPs 120-1 to 120-4 are connected to external connection terminals formed along one edge of the array substrate 100, and the opposite side edges thereof are connected to an external drive circuit 200.

The scan line drive circuits 115 sequentially output, to the scan lines G1 to Gm, scan signals for bringing the pixel transistors 102 into conduction and writing data signals into the pixel electrodes 103 from the signal lines S. The scan line drive circuits 115 are mounted on the array substrate 100.

On the external drive circuit 200, a control IC 201, and a power supply circuit, an interface circuit, and the like (not shown) are mounted.

The control IC 201 sorts data signals inputted from the outside in the order in which the data signals are outputted to the signal lines, and outputs the data signals. Additionally, the control IC 201 generates various kinds of timing signals, a clock signal, a control signal, and the like based on a reference clock signal inputted in synchronization with the data signals, and outputs them. More specifically, the control IC 201 supplies the scan line drive circuits 115 with a start signal and the clock signal, and supplies the signal line drive ICs 112 with sorted data signals, a register control signal, the clock signal, a load signal, and the like.

Further, the control IC 201 includes the function of controlling control signals (switch control signals) for controlling the on and off states of switches in this embodiment, and supplies the control signals to the signal line switch circuits 113.

The liquid crystal display device including the above-described array substrate 100 is constructed by placing the array substrate 100 and a counter substrate (not shown) so that they face each other a predetermined distance apart, bonding the perimeters thereof together with a sealant, and filling the liquid crystal layer 105 into the space between the array substrate 100 and the counter substrate.

As shown in the circuit diagram of FIG. 2, in the signal line switch circuits 113, switches ASW1, ASW2, ASW3, ASW4, . . . , ASWn-1, and ASWn (hereinafter referred to as "ASWs" or "switches ASW" as appropriate) are placed. Here, as one example, the switches ASW are switches having MOS structures. The signal lines S1, S2, S3, S4, . . . , Sn-1, and Sn are connected to the drain electrodes of the switches ASW, respectively. From the signal line drive ICs 112, output lines D1, D2, . . . , and Dx (hereinafter referred to as "output lines D" as appropriate) are routed.

Using the switches, each output line D is connected to n signal lines S (n is an integer equal to or greater than two) one after another within one horizontal period. In this embodiment, as one example, the value of n is set to two. Each output line D is connected to both of the source electrodes of two adjacent ASWs.

That is, for each output line D, two ASWs are arranged in a pair. The source electrodes of the two ASWs are connected to one common output line D. Further, the drain electrodes thereof are connected to different corresponding signal lines S, respectively.

From the signal line drive ICs 112 to the signal line switch circuits 113, n switch control signal lines ASWL are routed. Here, as one example, the value of n is two. Accordingly, the signal line switch circuits 113 have two switch control signal lines ASWL1 and ASWL2 (hereinafter referred to as "ASWLs" or "switch control signal lines ASWL" as appropriate).

Each of the switch control signal lines ASWL1 and ASWL2 is connected to alternate ones of the control electrodes (gate electrodes) of the switches ASW1, ASW2, ASW3, ASW4, . . . , ASWn-1, and ASWn.

The ASWs in this embodiment are, for example, n-type TFTs. In this case, for example, when a switch control signal ASW1U at a high potential is supplied to the switch control signal line ASWL1, the switches ASW2, ASW4, . . . , and ASWn are turned on, whereby data signals outputted to the output lines D1, D2, . . . , and Dx are supplied to the signal lines S2, S4, . . . , and Sn.

On the other hand, when a switch control signal ASW2U at a high potential is supplied to the switch control signal line ASWL2, the switches ASW1, ASW3, . . . , and ASWn-1 are turned on, whereby data signals outputted to the output lines D1, D2, . . . , and Dx are supplied to the signal lines S1, S3, . . . , and Sn-1.

In this embodiment, two data write periods are provided in one horizontal scan period. For example, in the first data write period, a switch control signal ASW1U at a high potential is supplied to the switch control signal line ASWL1, and, in the second data write period, a switch control signal ASW2U at a high potential is supplied to the switch control signal line ASWL2. Thus, switching is performed between the signal lines S2, S4, . . . , and Sn and the signal lines S1, S3, . . . , and Sn-1 within one horizontal scan period. This makes it possible to write data signals for one horizontal line into pixel electrodes. Such a drive system is called a signal line selection method. The adoption of a signal line selection method can reduce the number of routed output lines D connected to the array substrate 100 from the outside.

Figure 2:
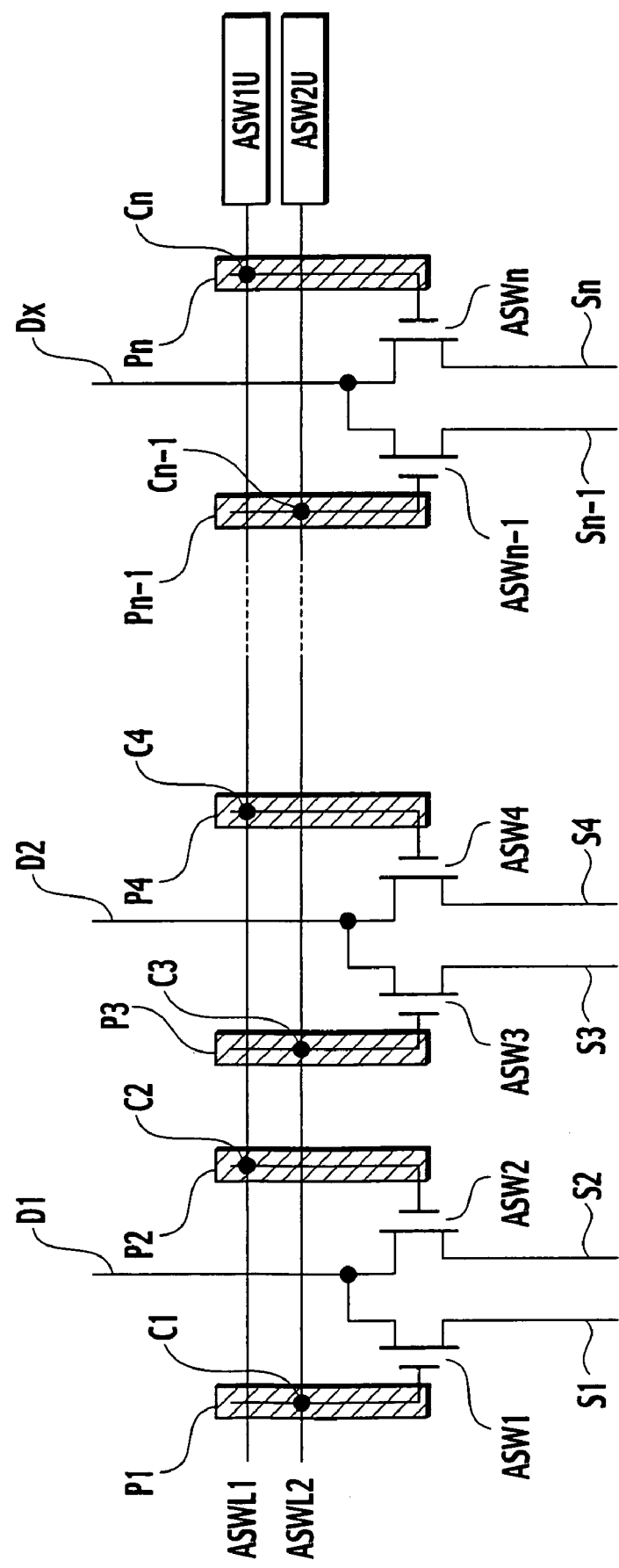
FIG. 2 is a circuit diagram showing the configuration of a signal line switch circuit shown in FIG. 1.

In FIG. 2, the gate electrodes of the switches ASW1, ASW2, ASW3, ASW4, . . . , ASWn-1, and ASWn are connected to the switch control signal lines ASWL1 and ASWL2 by electrode patterns P1, P2, P3, P4, . . . , Pn-1, and Pn (hereinafter referred to as "electrode patterns P" as appropriate) made of metal.

The electrode patterns P are formed so as to each two-dimensionally overlap all switch control signal lines ASWL and have substantially identical shapes. Here, since the value of n is two, alternate ones of the electrode patterns P extended from the gate electrodes of the switches AWS are connected to the same switch control signal line ASWL.

The electrode patterns P1, P2, P3, P4, . . . , Pn-1, and Pn are electrically connected to the switch control signal lines ASWL1 and ASWL2 by contact holes C1, C2, C3, C4, . . . , Cn-1, and Cn (hereinafter referred to as contact holes C as appropriate). The electrode patterns P and the switch control signal lines ASWL are stacked with an insulating layer (not shown) interposed therebetween. The contact holes C formed in this insulating layer allow each electrode pattern P to have electrical continuity only with one predetermined switch control signal line ASWL.

In the above-described configuration, all electrode patterns P two-dimensionally overlap the switch control signal lines ASWL1 and ASWL2 and are formed in patterns of substantially identical shapes. Accordingly, the areas of the electrode patterns P are approximately identical, and the parasitic capacitances of the switches ASW are also approximately equal.

Subsequently, the electrode configuration of a signal line switch circuit of a comparative example will be described. As shown in FIG. 3, in the signal line switch circuit of the comparative example, the lengths of electrode patterns from switch control signal lines ASWL1 and ASWL2 to the gate electrodes of left and right switches ASW in a pair are different between the left and right. Accordingly, a difference also occurs in the areas of the electrode patterns. As a result, the parasitic capacitances of the left and right switches ASW are unequal. Incidentally, in FIG. 3, components equivalent to those in FIG. 1 are denoted by the same reference numerals as those in FIG. 1.

On the other hand, in the electrode configuration of this embodiment, all ASWs have approximately equal parasitic capacitances. Accordingly, the times required to charge adjacent pixels with data signals are also approximately equal. Thus, display unevenness is eliminated, and favorable display characteristics can be obtained.

Further, in the electrode configuration of this embodiment, as shown in FIG. 2, electrode patterns having identical shapes are continuously placed. Accordingly, differences in length are easy to find, and pattern abnormalities can be easily found by visual inspection. This makes it possible to find pattern abnormalities early. Thus, process yield can be improved.

Furthermore, the electrical connections between the electrode patterns P and the switch control signal lines ASWL can be appropriately set by changing the positions where the contact holes are formed. Accordingly, in the case where the connections between the electrode patterns P and the switch control signal lines ASWL are changed, it is only necessary to change a contact hole formation layer, and the patterns of metal do not need to be changed. Thus, there is no need to change a plurality of masks, and an increase in the cost of a design change can be reduced. Additionally, it is possible to flexibly cope with a change to other drive system having a different connection form and to increase the flexibility of circuit design.

In this embodiment, a description has been given of a configuration in which each output line D extended from the signal line drive ICs 112 is branched to a pair of switches ASW to be connected to two signal lines. However, the present invention is not limited to this. It is possible to adopt a configuration in which each output line D is branched to n ASWs (n is an integer equal to or greater than two) to be connected to n signal lines.

Moreover, in this embodiment, a description has been given of an example in which the display unit 101 is divided into four blocks and in which a signal line drive IC 112 and a signal line switch circuit 113 are arranged for each block. However, the present invention is not limited to this. For example, the number of blocks into which the display unit 101 is divided may be larger, or the display unit 101 may be a single block without division.

The invention claimed is:

1. An array substrate for a flat display device comprising:
   a display unit in which a pixel is placed at each of intersections between a plurality of signal lines and a plurality of scan lines, the signal and scan lines being routed in the form of a matrix;
   a plurality of output lines configured to output data signals to the signal lines, respectively;
   a plurality of switches placed between the output lines and the signal lines to connect each output line to n signal lines (n is an integer equal to or greater than two) one after another within one horizontal period;
   n switch control signal lines configured to supply control electrodes of the switches with control signals for controlling on and off states thereof; and
   a plurality of electrode patterns configured to connect the control electrode of each switch to any one of the n switch control signal lines,
   wherein all of the electrode patterns have substantially identical shapes and two-dimensionally overlap all of the switch control signal lines, and areas of all the electrode patterns are substantially identical.

2. The array substrate according to claim 1, wherein the electrode patterns and the switch control signal lines are stacked with an insulating layer interposed therebetween, and are electrically connected to each other by contact holes formed in the insulating layer.

* * * * *